Nov. 1, 1966  J. A. RAKEL  3,281,906
COUPLING AND METHOD OF MAKING SAME
Filed Nov. 18, 1964

INVENTOR.
JAMES A. RAKEL
BY
*Kinney & Schenk*
ATTORNEYS

United States Patent Office 3,281,906
Patented Nov. 1, 1966

3,281,906
COUPLING AND METHOD OF MAKING SAME
James A. Rakel, Cincinnati, Ohio, assignor to The National Marking Machine Co., Cincinnati, Ohio, a corporation of Ohio
Filed Nov. 18, 1964, Ser. No. 412,197
13 Claims. (Cl. 24—33)

This invention relates to a coupling and a method of making the coupling and, more particularly, to a swivel coupling especially useful for connecting the ends of a flexible member to each other to form a conveyor or the like and a method for making the coupling.

The load-carrying strength of a conveyor is determined by the strength of the weakest link in the conveyor. In a conveyor formed of a flexible material such as rope, for example, the weakest link normally is the coupling connecting the two ends of the rope. The strength of the coupling limits the load-carrying strength of the conveyor so that the conveyor must be either shortened in length or limited in the amount of articles transported theron.

In a conveyor used in a dry cleaning plant to move clothing articles from one station to another in the cleaning process, the coupling limits the length of the conveyor because it is desired to not have to depend upon the judgment of the employees to determine the amount of articles, which the conveyor is capable of supporting. Therefore, the efficiency of the dry cleaning plant is indirectly dependent upon the strength of the coupling used in the conveyor.

The present invention provides a coupling of much greater strength than previously used to connect the ends of flexible members such as rope, for example, to form a conveyor. Thus, the length of the conveyor in a dry cleaning plant, for example, may be substantially increased to permit more efficient operation.

An object of this invention is to provide a coupling for use with a flexible member.

Another object of this invention is to provide a coupling capable of withstanding heavy loads.

A further object of this invention is to provide a method for forming a coupling capable of withstanding heavy loads.

Other objects, uses, and advantages of this invention are apparent upon a reading of this description, which proceeds with reference to the drawing forming part thereof and wherein.

Figure 1:
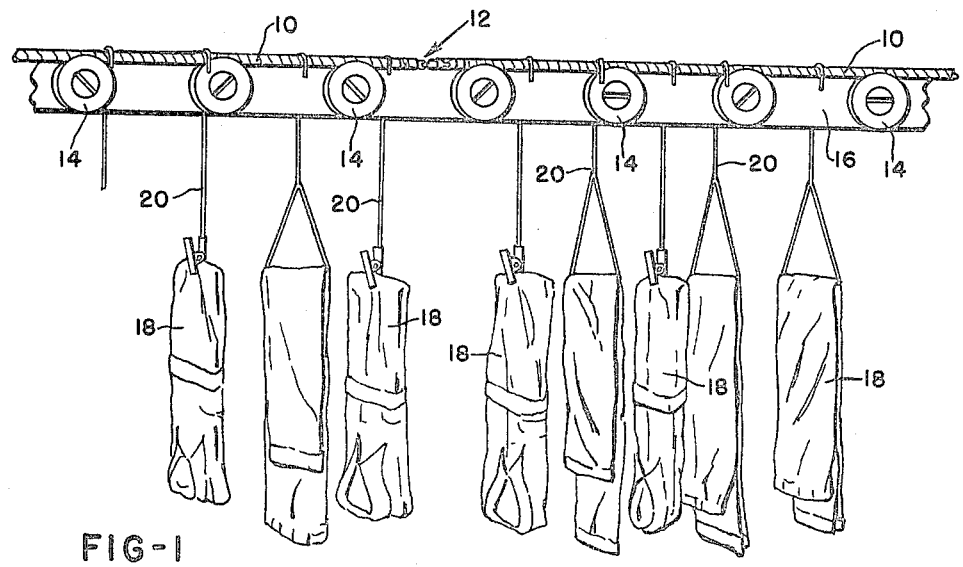
FIGURE 1 is a side elevational view of a conveyor including the coupling of the present invention.

Referring to the drawing and particularly FIGURE 1, there is shown an endless conveyor, which includes a member 10 and a swivel coupling 12 connecting the two ends of the member 10. The member 10 is preferably formed of a flexible material such as rope, for example.

The member 10 rides in grooves in a plurality of rollers 14, which are preferably formed of nylon. The rollers 14 are mounted on a rail 16, which is supported by suitable means (not shown).

A plurality of clothing articles 18 are supported on the flexible member 10 by support members 20. The clothing articles 18 are moved from one cleaning station to the next as the flexible member 10 is moved along the rollers 14 by suitable means (not shown).

Figure 2:
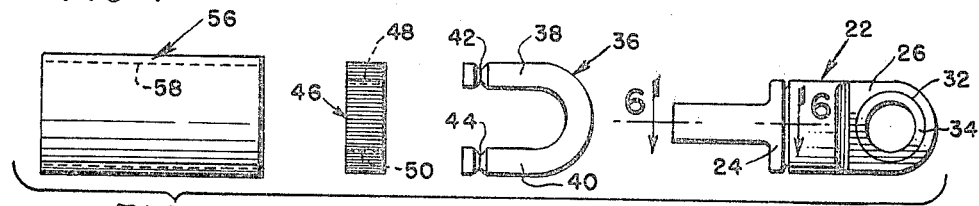
FIGURE 2 is an exploded side elevational view of some of the elements forming the coupling of the present invention.
Figure 3:
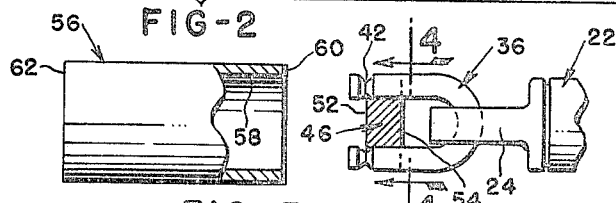
FIGURE 3 is a side elevational view, partly in section, showing a partial assembly of the elements of FIGURE 2.
Figure 6:
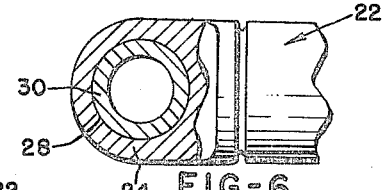
FIGURE 6 is a sectional view, partly in elevation, taken along the line 6—6 of FIGURE 2.

As shown in FIGURE 2, the swivel coupling 12 includes a swivel member 22 having portions 24 and 26 free to revolve with respect to each other in the well-known manner. The portion 24 has an opening 28 (see FIGURE 6) extending therethrough. A hardened annular insert 30, which functions as a bushing, is mounted in the opening 28 by soldering. The annular insert 30 is preferably made of a high carbon alloy such as "Carboloy" manufactured by General Electric Co.

The portion 26 of the swivel member 22 has an opening 32 extending therethrough (see FIGURE 2). A hardened annular insert 34, which is made of the same material as the insert 30, is disposed within the opening 32 in the same manner as the insert 30 is disposed within the opening 28.

The coupling 12 includes a U-shaped member 36, which is preferably formed of a very hard carbon steel. The member 36 is formed of a pair of spaced, parallel legs 38 and 40, which are connected at a closed end and are circular in cross section.

The leg 38 has a peripheral groove 42 adjacent the open end of the U-shaped member 36. The leg 40 of the U-shaped member 36 has a peripheral groove 44 formed adjacent the open end of the member 36.

Each of the grooves 42 and 44 is formed by tapering from each side toward the middle with the maximum depth of the groove being at its centerline. The centerlines of the grooves 42 and 44 are disposed in the same plane with the plane being substantially perpendicular to the longitudinal axes of the legs 38 and 40 of the U-shaped member 36.

In forming the coupling 12, the U-shaped member 36 is passed through the hardened annular insert 30, which is disposed in the opening 28 of the portion 24 of the swivel member 22.

The next step in forming the coupling 12 is to dispose a collar 46, which has a circular peripheral shape, between the spaced legs 38 and 40 of the U-shaped member 36. This closes the open end of the U-shaped member 36 to retain the portion 24 of the swivel member 22 therebetween.

Figure 4:
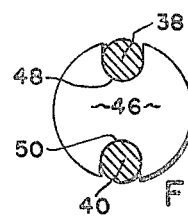
FIGURE 4 is a sectional view, partly in elevation, taken along the line 4—4 of FIGURE 3.

The collar 46 has a pair of oppositely disposed slots 48 and 50 (see FIGURE 4) extending therethrough for cooperation with the legs 38 and 40, respectively, of the U-shaped member 36. The outer peripheral surface of collar 46 is preferably knurled for a reason hereafter described. The depth of the slots 48 and 50 is substantially the same as the diameter or thickness of the legs 38 and 40 so that the legs 38 and 40 are substantially surrounded by the collar 46 except along their outermost sides.

The collar 46 is positioned between the legs 38 and 40 of the member 36 with an end 52 disposed in substantially the same plane as the centerlines of the peripheral grooves 42 and 44 in the legs 38 and 40, respectively, of the U-shaped member 36. The collar 46 has its end 54 disposed toward the closed end of the U-shaped member 36.

The next step in forming the coupling 12 is to dispose a hollow cylindrical member 56 over the collar 46 and the U-shaped member 36. The hollow cylindrical member 56 has its bore or interior 58 of substantially the same shape or configuration as the periphery of the collar 46. The hollow cylindrical member 56 is positioned with an end 60 in substantially the same plane as the end 54 of the collar 46 whereby the collar 46 is surrounded by the hollow cylindrical member 56. With the hollow cylindrical member 56 having its end 60 disposed in the same plane as the end 54 of the collar 46, the outermost portions of the legs 38 and 40 of the U-shaped member 36 are surrounded by the hollow cylindrical member 56.

Figure 5:
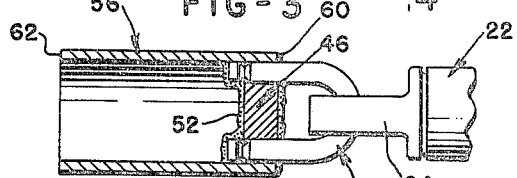
FIGURE 5 is a sectional view, partly in side elevation, showing the elements of FIGURE 2 in assembled relation.

With the end 52 of the collar 46 positioned in the same plane as the centerlines of the grooves 42 and 44 and the end 54 of the collar 46 in the same plane as the end 60 of the hollow cylindrical member 56 as shown in FIGURE 5, the elements of the coupling 12 are secured together. The preferred means of securing is by solder, which is inserted through open end 62 of the hollow cylindrical member 56. When the elements of the coupling 12 are being secured together by solder, the swivel member 22 and the closed end of the U-shaped member 36 are suspended or immersed in a liquid such as water, for example, to dissipate the heat produced by the soldering operation. Dissipating the heat in this manner eliminates the possibilities of annealing or softening of the U-shaped member 36.

The solder flows through the grooves 42 and 44 into the slots 48 and 50 and along the length of the slots 48 and 50 to the end 54 of the collar 46 to join the collar 46 and the U-shaped member 36 together. The solder also flows around the exterior of the collar 46 and the outermost portions of the legs 38 and 40 to join the U-shaped member 36 and the collar 46 to the hollow cylindrical member 56. Solder in grooves 42 and 44 present a large shear area so U-shaped 36 member will not pull out of the collar 46.

Since the entire exterior surface of the collar 46 is adjacent the surrounding hollow cylindrical member 56, there is presented a large area of bonding, which results from the brazing of the collar 46 and the hollow cylindrical member 56 together. This large bonding area greatly increases the strength of the coupling 12.

Figure 7:
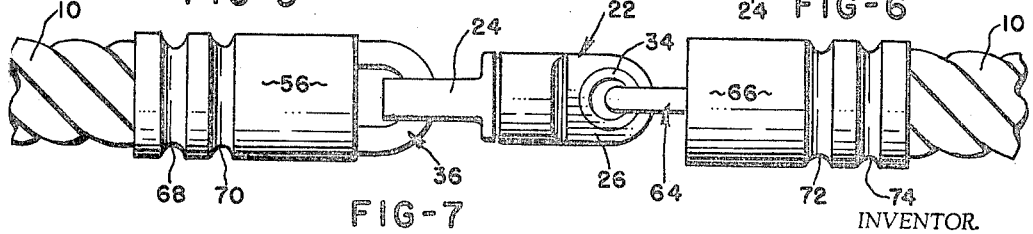
FIGURE 7 is an enlarged side elevational view of a portion of the structure of FIGURE 1 including the coupling of the present invention.

The portion 26 of the swivel member 22 has a U-shaped member 64 (see FIGURE 7), which is the same construction as the U-shaped member 36, connected thereto in the same manner as the U-shaped member 36 is attached to the portion 24 of the swivel member 22. A collar (not shown) is then positioned in the same manner as the collar 46 and a hollow cylindrical member 66 (see FIGURE 7) is then placed over the U-shaped member 64 and its cooperating collar (not shown) in the same manner as described with respect to the hollow cylindrical member 56, the collar 46, and the U-shaped member 36. The parts are then soldered together in the same manner as described with respect to the hollow cylindrical member 56, the collar 46, and the U-shaped member 36. The knurled peripheral surface of collar 46 aids the flow of solder there around, and this tends to form a more perfect bond.

Thus, the swivel coupling 12 includes a swivel member 22, a pair of identical U-shaped members 36 and 64, a pair of identical collars (one shown at 46), and a pair of identical hollow cylindrical members 56 and 66. It should be understood that each of the U-shaped members, each of the collars, and each of the hollow cylindrical members of the coupling 12 may be secured together by other than brazing solder.

The hollow cylindrical member 56 is adapted to receive one end of a flexible member 10. The end of the member 10 is inserted in the open end 62 of the hollow cylindrical member 56 and advanced therein until it abuts against the end 52 of the collar 46. At least two crimps 68 and 70 (see FIGURE 7) are formed in the hollow cylindrical member 56 to retain the flexible member 10 therein.

The other end of the flexible member 10 is inserted within the open end of the hollow cylindrical member 66 and advanced therein until it abuts against the inner end of the collar (not shown) in the same manner as described with respect to the hollow cylindrical member 56. At least two crimps 72 and 74 (see FIGURE 7) are made in the hollow cylindrical member 66 to retain the member 10 therein.

The hollow cylindrical members 56 and 66 are preferably formed of a steel, which hardens when it is worked. Thus, the crimps 68 and 70 in the hollow cylindrical member 56 and the crimps 72 and 74 in the hollow cylindrical member 66 hold their shape and depth after forming as a result of the material hardening so that the ends of the member 10 are retained therein.

When the coupling 12 is employed with the flexible member 10, tests have shown that the load strength of the conveyor, which is formed by the flexible member 10 and the coupling 12, is increased from approximately 300 pounds to approximately 1,500 pounds. Thus, a substantial increase in strength permits a much longer conveyor to be employed in a dry cleaning plant since it may carry many more clothing articles 18.

The coupling diameter is substantially the same or only very slightly greater than the diameter of flexible member 10, to permit the conveyor construction to be designed so that coupling will pass any place that flexible member 10 will pass.

While the conveyor has been described with respect to use in a dry cleaning plant it should be understood that a conveyor, which uses the coupling 12 of the present invention, may be used in any other environment. It also should be understood that the couplnig 12 may be employed to connect members together other than a flexible member, which forms a conveyor. Furthermore, if desired, the coupling 12 could be utilized with only the U-shaped member 36, the collar 46, and the hollow cylindrical member 56 with an attaching member replacing the portion 24 of the swivel member 22.

It also should be understood that the legs 38 and 40 of the U-shaped member 36 may have a cross section other than round and the peripheral or exterior configuration of the collar 46 may be other than circular. In such an arrangement, the interior 58 of the hollow cylindrical member 56, which will be a hollow tubular member, will have the same configuration as the exterior of the collar 46. Of course, this also applies to the U-shaped member 64, its cooperating collar (not shown), and the hollow cylindrical member 66.

An advantage of this invention is that a conveyor can carry a load several times greater than normal when it utilizes the coupling of the present invention. Another advantage of this invention is that a conveyor, which employs the coupling of the present invention, may be made much longer.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A conveyor comprising a flexible member; means to support said flexible member for movement thereon; a coupling connecting the ends of said flexible member to form an endless movable member; said coupling comprising a swivel member having an opening extending therethrough at each end; a U-shaped member disposed in each of said openings with its spaced legs opening away from said swivel member; each of said legs having a peripheral groove therein adjacent the open end of each of said U-shaped members with the centerlines of said grooves being in a plane substantially perpendicular to the longitudinal axes of said legs; a collar closing the open end of each of said U-shaped members; each of said collars having oppositely disposed slots to accommodate said legs of said adjacent shaped member; each of said collars having one end in substantially the same plane as the centerlines of said grooves in said legs and the other end closer to the closed end of said adjacent U-shaped member; hollow tubular members fitting over said legs of each of said U-shaped members and said cooperating collars with one end of each of said hollow tubular members being in substantially the same plane as said other end of each of said collars; the other end of each of said hollow tubular members receiving an end of said flexible member; said hollow tubular member, said U-shaped member, and said collar being soldered together; means securing one of said hollow tubular members to one end of said flexible member; and means securing the other of said hollow tubular members to the other end of said flexible member.

2. A conveyor comprising a flexible member; means to support said flexible member for movement thereon; a coupling connecting the ends of said flexible member to form an endless movable member; said coupling comprising a swivel member having an opening extending therethrough at each end; each of said openings having a hardened annular insert secured therein; a U-shaped member disposed in each of said inserts with its spaced legs opening away from said swivel member; each of said legs having a peripheral groove therein adjacent the open end of each of said U-shaped members with the centerlines of said grooves being in a plane substantially perpendicular to the longitudinal axes of said legs; a collar closing the open end of each of said U-shaped members; each of said collars having oppositely disposed slots to accommodate said legs of said adjacent U-shaped member; each of said collars having one end in substantially the same plane as the centerlines of said grooves in said legs and the other end closer to the closed end of said adjacent U-shaped member; hollow tubular members fitting over said legs of each of said U-shaped members and said cooperating collar with one end of each of said hollow tubular members being in substantially the same plane as said other end of each of said collars; the other end of each of said hollow tubular members receiving an end of said flexible member; said hollow tubular member, said U-shaped member, and said collar being soldered together; means securing one of said hollow tubular members to one end of said flexible member; and means securing the other of said hollow tubular members to the other end of said flexible member.

3. A swivel coupling comprising a swivel member, said swivel member having an opening in each end thereof extending therethrough, a U-shaped member disposed in each of said openings; each of said U-shaped members being formed of a pair of spaced legs connected at a closed end, a collar disposed between said legs of each of said U-shaped members, each of said collars having a pair of oppositely disposed slots extending therethrough, each of said slots receiving one of said legs of said adjacent U-shaped member, each of said collars being positioned with one end inwardly of the open end of each of said U-shaped members and the other end closer to the closed end of each of said U-shaped members, hollow tubular members surrounding the open end of each of said U-shaped members and said cooperating collar, each of said hollow tubular members having one end disposed in substantially the same plane as said other end of said cooperating collar and the other end disposed in spaced relation to the open end of each of said U-shaped members, and means securing each of said U-shaped members, said collars, and said hollow tubular members together.

4. A swivel coupling comprising a swivel member, said swivel member having an opening in each end thereof extending therethrough, a U-shaped member disposed in each of said openings, each of said U-shaped members being formed of a pair of spaced legs connected at a closed end, each of said U-shaped members having a peripheral groove in each of its legs adjacent the open end of said U-shaped member, a collar disposed between said legs of each of said U-shaped members, each of said collars having a pair of oppositely disposed slots extending therethrough, each of said slots receiving one of said legs of said adjacent U-shaped member, each of said collars being positioned with one end in substantially the same plane as the centerlines of said grooves in each of said U-shaped members and the other end closer to the closed end of each of said U-shaped members, hollow tubular members surrounding the open end of each of said U-shaped members and said cooperating collar, each of said hollow tubular members having one end disposed in substantially the same plane as said other end of said cooperating collar and the other end disposed in spaced relation to the open end of each of said U-shaped members, and means securing each of said U-shaped members, said collars, and said hollow tubular members together.

5. A swivel coupling comprising a swivel member, said swivel member having an opening in each end thereof extending therethrough, a hardened annular insert secured in each of said openings, a U-shaped member disposed in each of said hardened inserts, each of said U-shaped members being formed of a pair of spaced legs connected at a closed end, each of said U-shaped members having a peripheral groove in each of its legs adjacent the open end of said U-shaped member, a collar disposed between said legs of each of said U-shaped members, each of said collars having a pair of oppositely disposed slots extending therethrough, each of said slots receiving one of said legs of said adjacent U-shaped member, each of said collars being positioned with one end being in substantially the same plane as the centerlines of said grooves in each of said U-shaped members and the other end closer to the closed end of each of said U-shaped members, hollow tubular members surrounding the open end of each of said U-shaped members and said cooperating collar, each of said hollow tubular members having one end disposed in substantially the same plane as said other end of said cooperating collar and the other end disposed in spaced relation to the open end of each of said U-shaped members, and means securing each of said U-shaped members, said collars, and said hollow tubular members together.

6. A coupling comprising a U-shaped member formed of a pair of legs connected at its closed end; a collar disposed between said legs of said U-shaped member and surrounding said legs except on their outermost sides; a hollow tubular member fitting over said legs of said U-shaped member and contiguous to said outermost sides of said legs; one end of said hollow tubular member and one end of said collar being disposed in the same plane with said collar surrounded by said hollow tubular member; means securing said hollow tubular member, said U-shaped member, and said collar to each other; said hollow tubular member adapted to be connected to a first member adapted to fit in its open end; and said U-shaped member adapted to retain a second member between the closed end of said U-shaped member and said one end of said collar.

7. A coupling comprising a U-shaped member formed of a pair of legs connected at its closed end; a collar disposed between said legs of said U-shaped member and surrounding said legs except on their outermost sides; a hollow tubular member fitting over said legs of said U-shaped member and contiguous to said outermost sides of said legs; one end of said hollow tubular member and one end of said collar being disposed in the same plane with said collar surrounded by said hollow tubular member; said hollow tubular member, said U-shaped member, and said collar being soldered to each other; said hollow tubular member adapted to be connected to a first member adapted to fit in its open end; and said U- shaped member adapted to retain a second member between the closed end of said U-shaped member and said one end of said collar.

8. A coupling comprising a U-shaped member formed of a pair of legs connected at a closed end; said legs having peripheral grooves formed therein adjacent the open ends of said legs with the centerlines of said grooves being in a plane substantially perpendicular to the longitudinal axes of said legs; a collar having a pair of oppositely disposed slots; said collar being disposed between said legs of said U-shaped member with said slots accommodating said legs; one end of said collar being disposed in substantially the same plane as the centerlines of said grooves in said legs and the other end of said collar being closer to the closed end of said U-shaped member; a hollow tubular member partially disposed over said legs of said U-shaped member with one of its ends disposed in substantially the same plane as said other end of said collar and surrounding said collar; means securing said U-shaped member, said collar, and said hollow tubular member together; said hollow tubular member adapted to be connected to a first member adapted to fit in its open end; and said U-shaped member adapted to retain a second member between the closed end of said U-shaped member and said other end of said collar.

9. A coupling comprising a U-shaped member formed of a pair of legs connected at a closed end; said legs having peripheral grooves formed therein adjacent the open ends of said legs with the centerlines of said grooves being in a plane substantially perpendicular to the longitudinal axes of said legs; a collar having a pair of oppositely disposed slots; said collar being disposed between said legs of said U-shaped member with said slots accommodating said legs; one end of said collar being disposed in substantially the same plane as the centerlines of said grooves in said legs and the other end of said collar being closer to the closed end of said U-shaped member; a hollow tubular member partially disposed over said legs of said U-shaped member with one of its ends disposed in substantially the same plane as said other end of said collar and surrounding said collar; said U-shaped member, said collar, and said hollow tubular member being soldered together; said hollow tubular member adapted to be connected to a first member adapted to fit in its open end; and said U-shaped member adapted to retain a second member between the closed end of said U-shaped member and said other end of said collar.

10. A method of forming a coupling comprising the steps of placing an attaching member between the spaced legs of a U-shaped member and in contact with the closed end of the U-shaped member; forming a collar with a pair of oppositely disposed slots of substantially the same depth as the thickness of each of the legs of the U-shaped member; positioning the collar between the legs of the U-shaped member with the legs disposed in the slots of the collar; placing a hollow tubular member having its interior of substantially the same shape as the exterior configuration of the collar over the legs of the U-shaped member with one end of the hollow tubular member in substantially the same plane as one end of the collar whereby the collar is surrounded by the hollow tubular member; and soldering the hollow tubular member, the collar, and the legs of the U-shaped member together to form the coupling.

11. A method of forming a coupling comprising the steps of forming peripheral grooves in each of the legs of a U-shaped member with the centerlines of the grooves being in a plane substantially perpendicular to the longitudinal axes of the legs; placing an attaching member between the legs of the U-shaped member and adjacent the closed end of the U-shaped member; forming a collar with a pair of oppositely disposed slots of substantially the same depth as the thickness of each of the legs of the U-shaped member; positioning the collar between the legs of the U-shaped member with the legs disposed in the slots of the collar with one end of the collar disposed in substantially the same plane as the centerlines of the grooves in the legs of the U-shaped member and with the other end of the collar closer to the closed end of the U-shaped member to hold the attaching member therebetween; placing a hollow tubular member having its interior of substantially the same shape as the exterior configuration of the collar over the legs of the U-shaped member with one end of the hollow tubular member in substantially the same plane as the other end of the collar whereby the collar is surrounded by the hollow tubular member; and soldering the hollow tubular member, the collar, and the legs of the U-shaped member together to form the coupling.

12. A method of forming a coupling comprising the steps of forming peripheral grooves in each of the legs of a U-shaped member with the centerlines of the grooves being in a plane substantially perpendicular to the longitudinal axes of the legs; placing an attaching member between the legs of the U-shaped member and adjacent the closed end of the U-shaped member; forming a collar with a pair of oppositely disposed slots of substantially the same depth as the thickness of each of the legs of the U-shaped member; positioning the collar between the legs of the U-shaped member with the legs disposed in the slots of the collar with one end of the collar disposed in substantially the same plane as the centerlines of the grooves in the legs of the U-shaped member and with the other end of the collar closer to the closed end of the U-shaped member to hold the attaching member therebetween; placing a hollow tubular member having its interior of substantially the same shape as the exterior configuration of the collar over the legs of the U-shaped member with one end of the hollow tubular member in substantially the same plane as the other end of the collar whereby the collar is surrounded by the hollow tubular member; and soldering the hollow tubular member, the collar, and the legs of the U-shaped member together with the attaching member and the closed end of the U-shaped member disposed in a liquid to dissipate heat to form the coupling.

13. A method of forming a coupling comprising the steps of forming peripheral grooves in each of the legs of a U-shaped member with the centerlines of the grooves being in a plane substantially perpendicular to the longitudinal axes of the legs; placing an attaching member between the legs of the U-shaped member and adjacent the closed end of the U-shaped member; forming a collar with a pair of oppositely disposed slots of substantially the same depth as the thickness of each of the legs of the U-shaped member; positioning the collar between the legs of the U-shaped member with the legs disposed in the slots of the collar with one end of the collar disposed in substantially the same plane as the centerlines of the grooves in the legs of the U-shaped member and with the other end of the collar closer to the closed end of the U-shaped member to hold the attaching member therebetween; placing a hollow tubular member having its interior of substantially the same shape as the exterior configuration of the collar over the legs of the U-shaped member with one end of the hollow tubular member in substantially the same plane as the other end of the collar whereby the collar is surrounded by the hollow tubular member; soldering the hollow tubular member, the collar, and the legs of the U-shaped member together to form the coupling; inserting a flexible member within the other end of the hollow tubular member, and crimping the hollow tubular member to secure the flexible member thereto.

References Cited by the Examiner

UNITED STATES PATENTS 286,228   10/1883   Ross.
816,721   4/1906    Frazier.

(Other references on following page)

UNITED STATES PATENTS

| | | | |
|---|---|---|---|
| 979,567 | 12/1910 | Rosenthal. | |
| 1,121,736 | 10/1914 | Lee et al. | 287—82 |
| 1,449,765 | 3/1923 | McLaughlin. | |
| 1,461,033 | 7/1923 | Frieze | 24—123 |
| 1,614,751 | 1/1927 | Mitchell | 24—33 |
| 2,047,639 | 7/1936 | Kremer | 24—33 |
| 2,550,174 | 4/1951 | Towner | 29—470.5 |
| 2,571,052 | 10/1951 | Mount | 287—82 |
| 2,803,486 | 8/1957 | Larson et al. | 287—82 X |
| 3,156,330 | 11/1964 | Berg | 29—470.5 |
| 3,174,273 | 3/1965 | Ehmann | 59—93 |
| 3,191,288 | 6/1965 | George | 29—470.5 |

WILLIAM FELDMAN, *Primary Examiner.*

MILTON S. MEHR, *Examiner.*